United States Patent [19]
Katagiri

[11] Patent Number: 5,138,899
[45] Date of Patent: Aug. 18, 1992

[54] FOOT-OPERATED PARKING BRAKE SYSTEM

[75] Inventor: Shunitsu Katagiri, Atsugi, Japan

[73] Assignee: Nissan Motor Co., Ltd., Yokohama, Japan

[21] Appl. No.: 584,957

[22] Filed: Sep. 19, 1990

[30] Foreign Application Priority Data

Sep. 29, 1989 [JP] Japan .................. 1-252257

[51] Int. Cl.$^5$ .............................................. G05G 1/14
[52] U.S. Cl. ...................................... 74/512; 74/529; 74/531; 188/77 W
[58] Field of Search .......................... 74/512, 529-531, 74/537-540; 188/77 W

[56] References Cited

U.S. PATENT DOCUMENTS

| | | | |
|---|---|---|---|
| 3,069,764 | 12/1962 | Swats et al. | 74/539 X |
| 3,109,320 | 11/1963 | Krautwurst | 74/537 X |
| 3,136,177 | 6/1964 | Roberts et al. | 74/531 |
| 3,236,120 | 2/1966 | Fender | 74/531 |
| 3,236,121 | 2/1966 | Gdowik et al. | 74/531 X |
| 3,301,086 | 1/1967 | Williams et al. | 74/529 X |
| 3,443,450 | 5/1969 | Fender | 74/531 |
| 4,281,736 | 8/1981 | Lizzio | 74/512 X |
| 4,391,159 | 7/1983 | Sellmeyer | 74/540 X |
| 4,850,242 | 7/1989 | Hass et al. | 74/512 |

FOREIGN PATENT DOCUMENTS

| | | | |
|---|---|---|---|
| 0013134 | 1/1979 | Japan | 74/529 |
| 61-78773 | 5/1986 | Japan . | |

*Primary Examiner*—Leslie A. Braun
*Assistant Examiner*—Winnie Yip
*Attorney, Agent, or Firm*—Pennie & Edmonds

[57] ABSTRACT

A foot-operated parking brake system includes a rotor assembly rotatable in an interlocked relation with a parking brake pedal and having two reels. Coils are wound around the respective reels for holding the rotor assembly yieldingly fixed with a predetermined fastening force and thereby holding the parking brake pedal in its brake applied position. The rotor assembly can be released from the fastening force by twisting the coils in unwinding directions thereof and thereby reducing respective fastening forces exerted by the coils beyond the bias of a coil which urges the parking brake pedal toward its brake released position.

8 Claims, 3 Drawing Sheets

FOOT-OPERATED PARKING BRAKE SYSTEM

BACKGROUND OF THE INVENTION

1. Field of the Invention

The present invention relates to a foot-operated parking brake system for an automotive vehicle.

2. Description of the Prior Art

An example of a prior art foot-operated parking brake system is disclosed in Japanese Provisional Utility Model Publication No. 61-78773 which is shown in FIG. 4. In the figure, a parking brake pedal 1 is pivotally installed on a pivot 2 so as to be swingable in the opposite directions, i.e., in the forward or depressing direction "A" and in the rearward or returning direction "B" and urged in the returning direction "B" by means of an unshown return spring. The pedal 1 has a fan-shaped upper end portion 3 which is formed with ratchet teeth 4 at the arcuated upper edge thereof. A pivot 5 is installed on the fan-shaped upper end portion 3 at a location below the ratchet teeth 4 and connected with a wire 6 leading to brakes. A pawl 8 is pivotally installed on a stationary pivot 9 and urged by a spring 7 for engagement with the ratchet teeth 4. The pawl 8 is turnable in the direction "X" for disengagement from ratchet teeth 4 when a brake releasing knob 10 is pulled to turn a lever 11 in a predetermined direction. The pedal 1 is connected to a reciprocative piston rod 13 of an air damper 12 and abuttingly engageable with a stopper 14 for thereby being held in its brake released position.

With this structure, depression on the pedal 1 causes the wire 6 to be pulled for, thereby applying the brakes. The depressed pedal 1 is held in a brake applied position by interengagement of the pawl 8 and the ratchet teeth 4. In order to release the brakes, the brake releasing knob 10 is pulled to turn, by way of the lever 11, the pawl 8 in the direction "X" and thereby disengage the same from the ratchet teeth 4. In this instance, by the effect of the air damper 12, the pedal 1 does not turn forcibly and rapidly but gradually toward the brake released position, thus not being subjected to any large impact.

A problem of the prior art parking brake system is that since the pedal 1 is adapted to be held in its depressed positions, i.e., in its brake applied positions by interengagement of the pawl 8 and the ratchet teeth 4 a click-clack sound results from interengagement of the ratchet teeth 4 and the pawl 8 at any time of operation of the pedal 1. Another problem is that the air damper 12, which is employed for preventing forcible and rapid return of the pedal 1, is heavy and costly, resulting in the heavy weight and expensive cost of the parking brake.

SUMMARY OF THE INVENTION

In accordance with the present invention, there is provided a foot-operated parking brake system which comprises a parking brake pedal swingable between a brake applied position and brake released position, spring means for urging the parking brake pedal toward the brake released position, a rotor assembly having reel means, gear means interengaging the rotor assembly and the parking brake pedal in such a manner that the rotor assembly is rotatable in an interlocked relation with the parking brake pedal, coil means wound around the reel means for holding the rotor assembly yieldingly fixed with a predetermined fastening force and thereby holding the brake pedal in the brake applied position, prevailing a bias of the spring means, and releasing means for releasing the rotor assembly from the fastening force and thereby allowing the parking brake pedal to turn toward the brake released position under the bias of the spring means by twisting the coil means in its unwinding direction and thereby reducing the fastening force to be applied to the reel means beyond the bias of the spring means.

This structure is effective for overcoming the above noted disadvantages or shortcomings inherent in the prior art device.

It is accordingly an object of the present invention to provide a foot-operated parking brake system which is quiet in operation, i.e., which does not cause such a click-clack sound as in a prior art device.

It is another object of the present invention to provide a foot-operated parking brake system of the above described character which can prevent a parking brake pedal from returning forcibly and rapidly to its brake released position without requiring a heavy and costly device as an air damper.

It is a further object of the present invention to provide a foot-operated parking brake system of the above described character which is light in weight, economical in cost and reliable in operation.

DESCRIPTION OF THE PREFERRED EMBODIMENT

Figure 1:
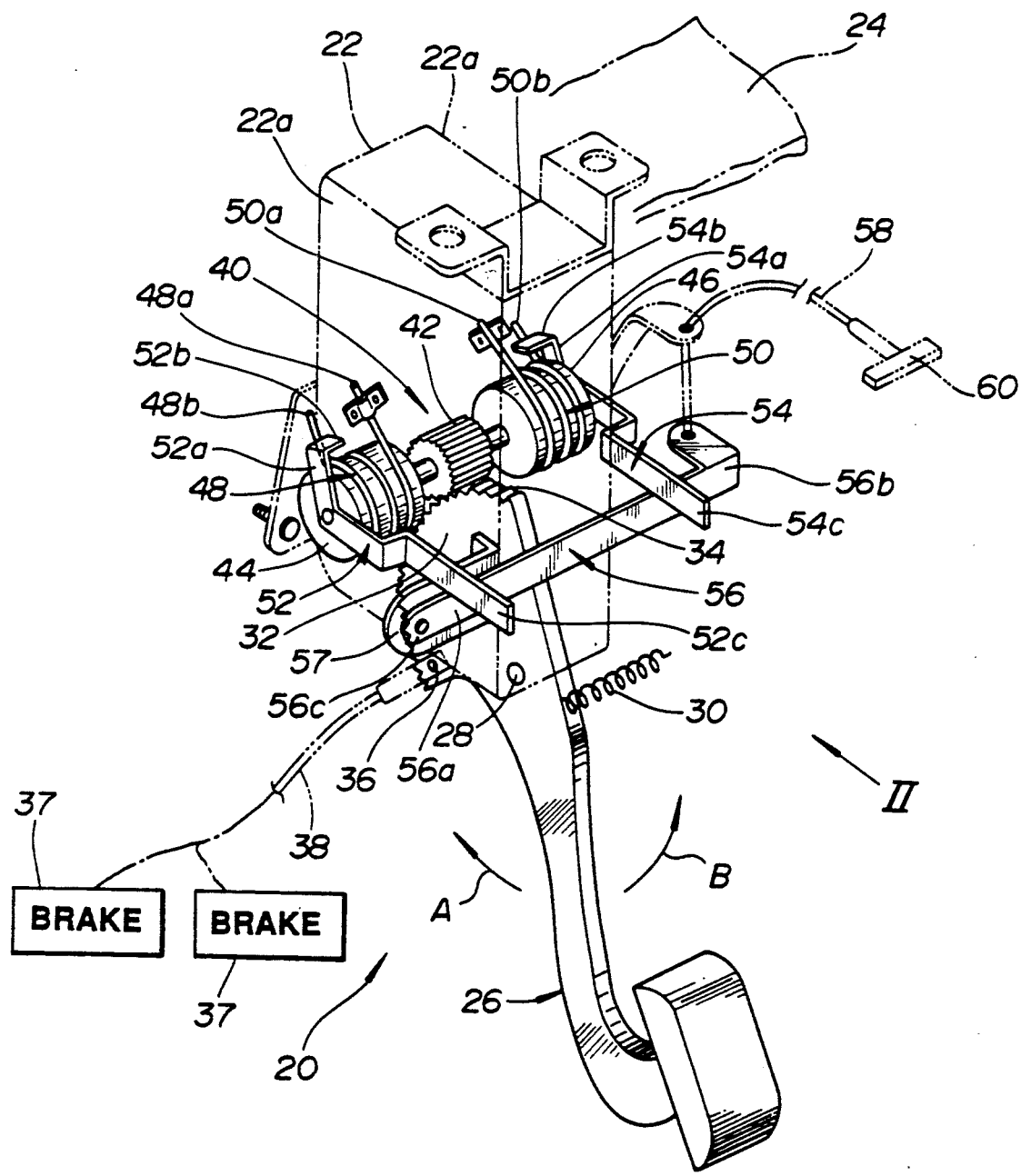
FIG. 1 is a perspective view of a foot-operated parking brake system according to an embodiment of the present invention.
Figure 2:
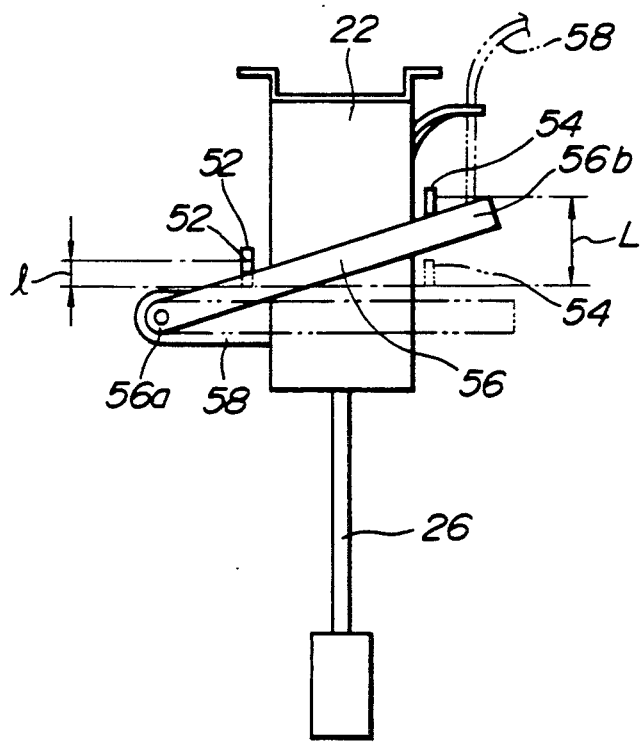
FIG. 2 is a view taken in the direction "II" in FIG. 1 and shows movement of a cross lever between a horizontal position and inclined position.
Figure 3:
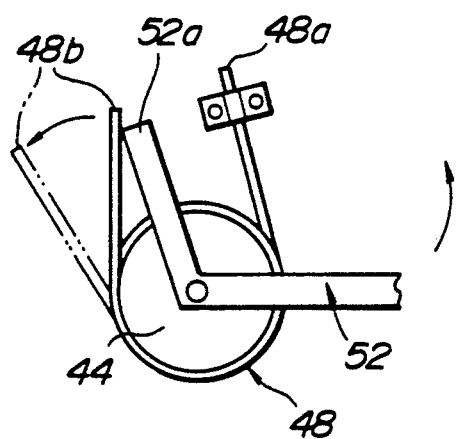
FIG. 3 is a view taken in the direction "III" in FIG. 1 and shows twisting of a coil in its unwinding direction by means of a side lever.
Figure 4:
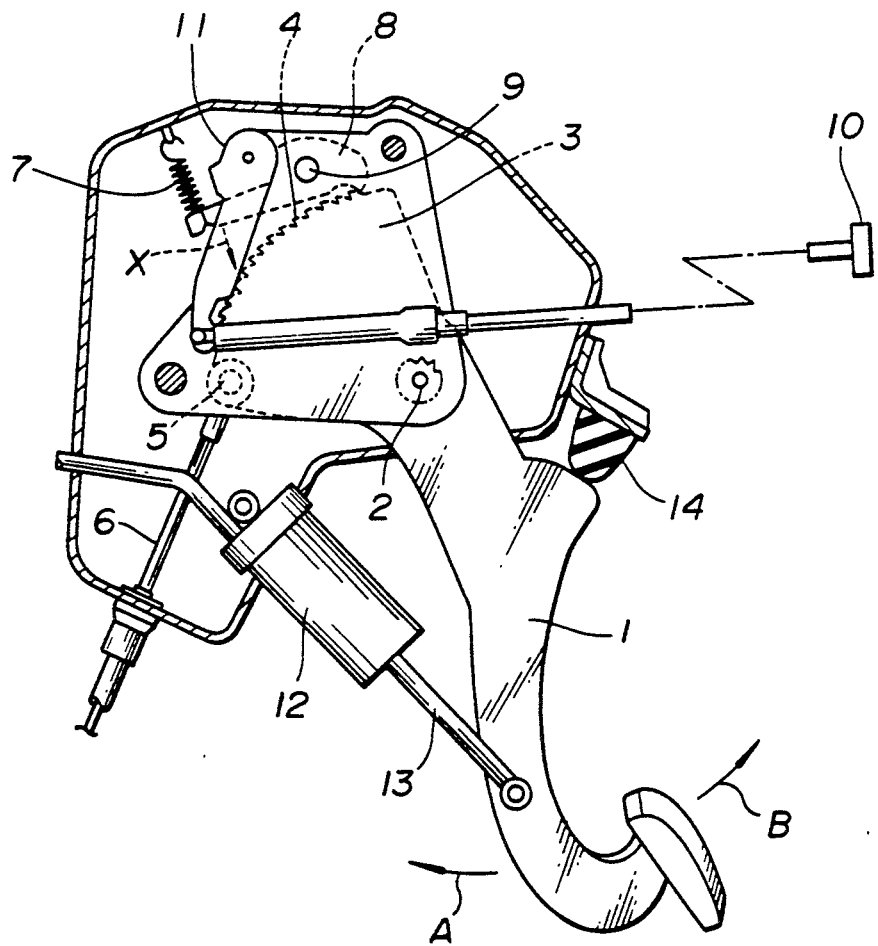
FIG. 4 is a side elevational view of a prior art foot-operated parking brake system.

Referring to FIGS. 1 to 3, a foot-operated parking brake system according to an embodiment of the present invention is generally indicated by the reference numeral 20 and includes a casing 22 disposed forward of a driver and fixedly attached to a vehicle body 24. A parking brake pedal 26 is pivotally installed at 28 on a lower end portion of the casing 22 in such a way as to be swingable in a depressing direction "A" and returning direction "B". A return spring 30 is disposed between the brake pedal 26 and the vehicle body 24 to interconnect the same for, thereby urging the pedal 26 in the returning direction "B". The pedal 26 has a fan-shaped upper end portion 32 which is formed into a sector gear provided with teeth 34. The pedal 26 has at the fan-shaped upper end portion 32 a connecting pin 36. A wire 38 is connected to the connecting pin 36 and leads to the brakes 37 for operating the same.

A rotor assembly 40 elongated laterally or crosswise of the vehicle body 24 is rotatably installed on the casing 22 in such a way as to have an axially central portion disposed within the casing 22 and opposite axial end portions protruding outwardly from same. The rotor assembly 40 has fixedly and concentrically installed on the axially central portion a ring gear 42 engaged with the sector gear 34 such that the rotor assembly 40 is bodily rotatable in an interlocked relation with the brake pedal 26. The rotor assembly 40 further has reels 44, 46 fixedly and concentrically installed on the opposite axial end portions outside the casing 22, respectively. Coils 48, 50 formed from resilient wires are wound around the respective reels 44, 46 so as to hold the same yieldingly tight or fixed with a predetermined fastening force, and have one ends 48a, 50a fixedly attached to respective side walls 22a, 22a of the casing 22 and the other ends 48b, 50b serving as movable ends.

Side levers 52, 54 are elongated longitudinally of the vehicle body 24, i.e., elongated crosswise of the center axis of the rotor assembly 40 and installed on the outer axial ends of the reels 44, 46 in such a way as to be swingable about the center axis of the reels 44, 46. The side levers 52, 54 have first arms 52a, 54a extending from the center axes of the reels 44, 46 forward of the vehicle body 24 and formed with bent axial ends 52b, 54b for abutting engagement with the other ends 48b, 50b of the coils 48, 50. The side levers 52, 54 have second arms 52c, 54c extending from the reels 44, 46 rearward of the vehicle body 24 so as to locate above opposite aixal end portions 56a, 56b of a cross lever 56 which extends laterally or crosswise of the vehicle body 24, i.e., which extends in the direction transversal to the side levers 52, 54. A bracket 57 is installed on one side wall 22a of the casing 22 and projects therefrom laterally of the vehicle body 24, i.e., in the direction transversal to the side lever 52. The cross lever 56 is pivotally installed at the axial end portion 56a on the bracket 57 by means of a pivot 56c. The cross lever 56 is connected at the end portion 56b serving as a free end portion to an end of a wire 58 which is in turn connected at the other end to a release knob 60.

The above described foot-operated parking brake system operates as follows.

In order to apply the brakes 37, the parking brake pedal 26 is depressed against the bias of the return spring 30, i.e., turned in the direction "A" while driving the rotor assembly 40 in a predetermined direction by the effect of interengagement of the sector gear 34 of the pedal 26 and the gear 42 of the rotor assembly 40. In this instance, although the reels 44, 46 of the rotor assembly 40 are held yieldingly tight or fixed with the respective fastening forces exerted by the coils 48, 50, the rotor assembly 40 is rotated relative to the coils 48, 50 when a depressing force on the pedal 26 is larger than a predetermined value to prevail the fastening forces of the coils 48, 50. This rotation of the rotor assembly 40 relative to the coils 48, 50 does not cause such a click-clack sound as in the prior art parking brake system but is performed quietly. When the pedal 26 is turned as described above, the wire 38 is pulled to apply the brakes 37. Thereafter, the parking brake pedal 26, which is released from depression, is held in a brake applied position by the effect of the fastening forces of the coils 48, 50 applied to the reels 44, 46, which fastening forces are set so as to prevail over the force of the return spring 30. In the meantime, when the fastening force of each of the coils 48, 50 relative to a corresponding one of the reels 44, 46 is set so as to prevail over the force of the return spring 30, the parking brake system 20 can function properly even when one of the coils 48, 50 is broken, thus making it possible to attain an increased reliability in operation.

In order to release the brakes 37, the release knob 60 is pulled toward the driver. By this, the cross lever 56 is driven by way of the wire 58 and turned so as to cause the free end portion 56b to move upwardly, i.e., the cross lever 56 is put into an inclined state as shown by the solid line in FIG. 2. By this turning of the cross lever 56, the second arm portions 52c, 54c of the side levers 52, 54 located above the opposite end portions 56a, 56b of the cross lever 56, are moved upwardly, thus causing the first arms 52a, 54a to push the free ends 48b, 50b of the coils 48, 50 in the unwinding direction as shown in FIG. 3 for thereby reducing the fastening forces of the coils 48, 50 to be applied to the reels 44, 46. In this instance, the side lever 54 nearer to the free end portion 56b of the cross lever 56 is elevated first, and the height "L" of elevation of the side lever 54 is larger than the height "l" of elevation of the side lever 52 nearer to the pivotal end portion 56a. Due to this, the coil 50 is twisted first, and its amount of twisting in the unwinding direction is larger. In this connection, the coil 50 is set so as to reduce its fastening force relative to the reel 46 to nearly zero when it is maximumly twisted. On the other hand, as compared with the coil 50, the coil 48 matched with the side lever 52 is delayed in twisting in its unwinding direction, and furthermore the amount of twisting is smaller. The coil 48 is thus set so as to still exert a certain fastening force relative to the reel 44 even when the coil 48 is maximumly twisted. In this manner, the sum of the fastening forces of the coils 44, 50 becomes smaller than the bias of the return spring 30. When this is the case, the coils 44, 50 can no longer hold the pedal 26 in its brake applied position but the pedal 26 is allowed to turn in the returning direction "B" under the bias of the return spring 30. In this instance, since the coil 48 still applies a certain fastening force to the reel 44, the fastening force serves as a constant resistance to tuning of the pedal 26 toward its brake released position, thus making it possible not to cause forcible and rapid turn of the pedal 26 but to attain gradual turn of same.

What is claimed is:

1. A foot-operated parking system comprising:
a parking brake pedal swingable between a brake applied position and a brake released position;
spring means for urging said parking brake pedal toward the brake released position;
a rotor assembly having reel means which comprises a pair of reels;
gear means interengaging said rotor assembly and said parking brake pedal in such a manner that said rotor assembly is rotatable in an interlocked relation with said parking brake pedal;
coil means comprising a pair of coils wound around said pair of reels, respectively for holding said rotor assembly yieldingly fixed with a predetermined fastening force and thereby holding said brake pedal in the brake applied position, prevailing over a bias of said spring means,
releasing means pivotally connected to said pair of reels for releasing said rotor assembly from said fastening force and thereby allowing said parking brake pedal to turn toward the brake released position under the bias of said spring means by twisting said pair of coils in its unwinding direction and thereby reducing said fastening force to be applied to said pair of reels beyond the bias of said spring means and for releasing one of the coils more rapidly and largely than the other of the coils,
wherein each of said coils has one end fixed to a stationary member and another end engaged with said releasing means, said another end being movable with releasing means so that one of the coils releases more rapidly and largely than the other of the coils.

2. The foot-operated parking brake system as claimed in claim 1, wherein said fastening force is the sum of fastening forces exerted by said coils.

3. The foot-operated parking brake system as claimed in claim 2, wherein said releasing means comprises two side levers pivotally connected to outer axial ends of said reels, a cross lever extending transversely to said side levers, one end of said cross lever being pivotally connected to the stationary member and an end opposite said one end of said cross lever being operatively connected to a release knob via a wire, each of said side levers having a first arm extending radially of the respective reel and engaging said another end of the respective coil and a second arm extending radially of the respective reel and above an end portion of said cross lever such that pull of said release knob in a predetermined direction causes said cross lever to rotate about said one end thereof to turn said side levers, causing said coils to unwind and causing the side lever nearer to said another end of said cross lever to turn more than the other of said side levers remoter from said another end of said cross lever.

4. The foot-operated parking brake system as claimed in claim 3 wherein said parking brake pedal comprises a sector gear at an upper end portion thereof, and said rotor assembly comprises a ring gear meshed with said sector gear and located between said coils, said sector gear and said ring gear constituting said gear means.

5. The foot-operated parking brake system as claimed in claim 4, further comprising a casing installed on a vehicle body, said rotor assembly being rotatably installed on said casing in such a manner that said ring gear is inside of said casing and said reels are outside of same, said parking brake pedal being swingably installed on a lower end portion of said casing in such a manner that said sector gear is inside of said casing.

6. The foot-operated parking brake system as claimed in claim 5 wherein said stationary member to which said one ends of said coils are fixed is side walls of said casing.

7. The foot-operated parking brake system as claimed in claim 5 wherein said stationary member on which said cross lever is pivotally installed is constituted by a bracket projecting from one of said side walls of said casing in the direction transversal to one of said side levers.

8. The foot-operated parking brake system as claimed in claim 1, further comprising brake means and wire means interconnecting said parking brake pedal and said brake means such that said brake means is applied when said parking brake pedal is in the brake applied position and released when said parking brake pedal is in the brake released position.

* * * * *